US012696359B2

(12) United States Patent
Batista et al.

(10) Patent No.: US 12,696,359 B2
(45) Date of Patent: Jul. 28, 2026

(54) HEATER FOR AEROSOL-GENERATING DEVICE WITH HOLLOW SUSCEPTOR PIN

(71) Applicant: Philip Morris Products S.A., Neuchatel (CH)

(72) Inventors: Rui Nuno Rodrigues Alves Batista, Morges (CH); Ricardo Cali, Mannheim (DE); Edward Kiernan, La Croix-sur-Lutry (CH)

(73) Assignee: Philip Morris Products S.A., Neuchatel (CH)

( * ) Notice: Subject to any disclaimer, the term of this patent is extended or adjusted under 35 U.S.C. 154(b) by 510 days.

(21) Appl. No.: 18/253,300

(22) PCT Filed: Nov. 19, 2021

(86) PCT No.: PCT/EP2021/082252

§ 371 (c)(1),
(2) Date: May 17, 2023

(87) PCT Pub. No.: WO2022/112115

PCT Pub. Date: Jun. 2, 2022

(65) Prior Publication Data

US 2024/0015858 A1 Jan. 11, 2024

(30) Foreign Application Priority Data

Nov. 24, 2020 (EP) .................................... 20209532

(51) Int. Cl.
*A24F 40/465* (2020.01)
*A24F 40/20* (2020.01)
*H05B 6/10* (2006.01)

(52) U.S. Cl.
CPC ............ *H05B 6/108* (2013.01); *A24F 40/20* (2020.01); *A24F 40/465* (2020.01)

(58) Field of Classification Search
None
See application file for complete search history.

(56) References Cited

U.S. PATENT DOCUMENTS

2018/0192701 A1 7/2018 Stoner
2020/0221775 A1* 7/2020 Mironov .............. A24F 40/465
(Continued)

FOREIGN PATENT DOCUMENTS

CN 1126426 A 7/1996
CN 109674095 A 4/2019
(Continued)

OTHER PUBLICATIONS

English machine translation of JP-2018537960-A published Dec. 27, 2018; A24F40/70; 33 pages. (Year: 2018).*
(Continued)

*Primary Examiner* — Linda L Gray
(74) *Attorney, Agent, or Firm* — Oblon, McClelland, Maier & Neustadt, L.L.P.

(57) ABSTRACT

A heater assembly for an aerosol-generating device is provided, including a heating chamber configured to heat an aerosol-forming substrate; an evacuated air-tight hollow pin arranged centrally within the heating chamber; and a susceptor layer on an outer surface of the evacuated air-tight hollow pin. An aerosol-generating device including the heater assembly, and an aerosol-generating system including the aerosol-generating device and an aerosol-generating article, are also provided.

18 Claims, 4 Drawing Sheets

(56) References Cited

U.S. PATENT DOCUMENTS

| | | | |
|---|---|---|---|
| 2020/0245683 | A1 | 8/2020 | Batista et al. |
| 2021/0084980 | A1 | 3/2021 | Lee et al. |
| 2021/0145061 | A1 | 5/2021 | Fursa et al. |

FOREIGN PATENT DOCUMENTS

| | | | | |
|---|---|---|---|---|
| JP | 2018-537960 | A | 12/2018 | |
| JP | 2019186178 | A | 10/2019 | |
| JP | 2020-529214 | A | 10/2020 | |
| JP | 2020-529217 | A | 10/2020 | |
| JP | 2020-532977 | A | 11/2020 | |
| KR | 10/2020/0016223 | A | 2/2020 | |
| KR | 1020200032017 | A | 3/2020 | |
| KR | 1020200056994 | A | 5/2020 | |
| KR | 10-2020-0098027 | | 8/2020 | |
| KR | 1020200105692 | A | 9/2020 | |
| RU | 2 682 771 | C1 | 3/2019 | |
| RU | 2 721 088 | C2 | 5/2020 | |
| RU | 2 736 230 | C2 | 11/2020 | |
| WO | WO 2017/072144 | A1 | 5/2017 | |
| WO | WO 2017/137510 | A1 | 8/2017 | |
| WO | WO 2017/140898 | A1 | 8/2017 | |
| WO | WO 2019/030361 | A1 | 2/2019 | |
| WO | WO-2019030000 | A1 * | 2/2019 | ............. H05B 6/105 |
| WO | WO 2020/074601 | A1 | 4/2020 | |
| WO | WO 2020/074622 | A1 | 4/2020 | |
| WO | WO 2020/116798 | A1 | 6/2020 | |

OTHER PUBLICATIONS

International Preliminary Report on Patentability and Written Opinion issued Jun. 8, 2023 in PCT/EP2021/082252, 7 pages.

Japanese Ofice Action dated May 7, 2024 in corresponding Japanese Patent Application No. 2023-530887 (with English translation), 6 pages.

Combined Russian Office Action and Search Report issued Sep. 18, 2023 in Russian Patent Application No. 2023115024/03 (submitting English Translation only), 7 pages.

International Search Report & Written Opinion issued Mar. 3, 2022 in PCT/EP2021/082252 filed on Nov. 19, 2021, 12 pages.

Combined Chinese Office Action and Search Report issued Feb. 4, 2026 in Chinese Patent Application No. 202180073989.7 (with English Translation), 13 pages.

Notice of Allowance dated Apr. 2, 2026, issued in corresponding South Korean patent application No. 10-2023-7017204 (citing documents 1-4).

* cited by examiner

Fig. 4
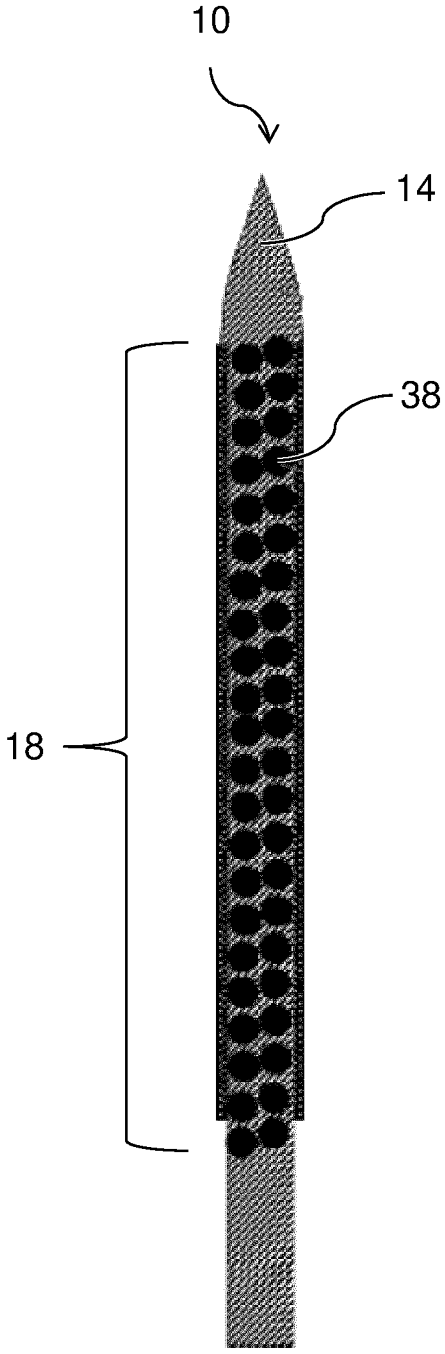
Fig. 4a
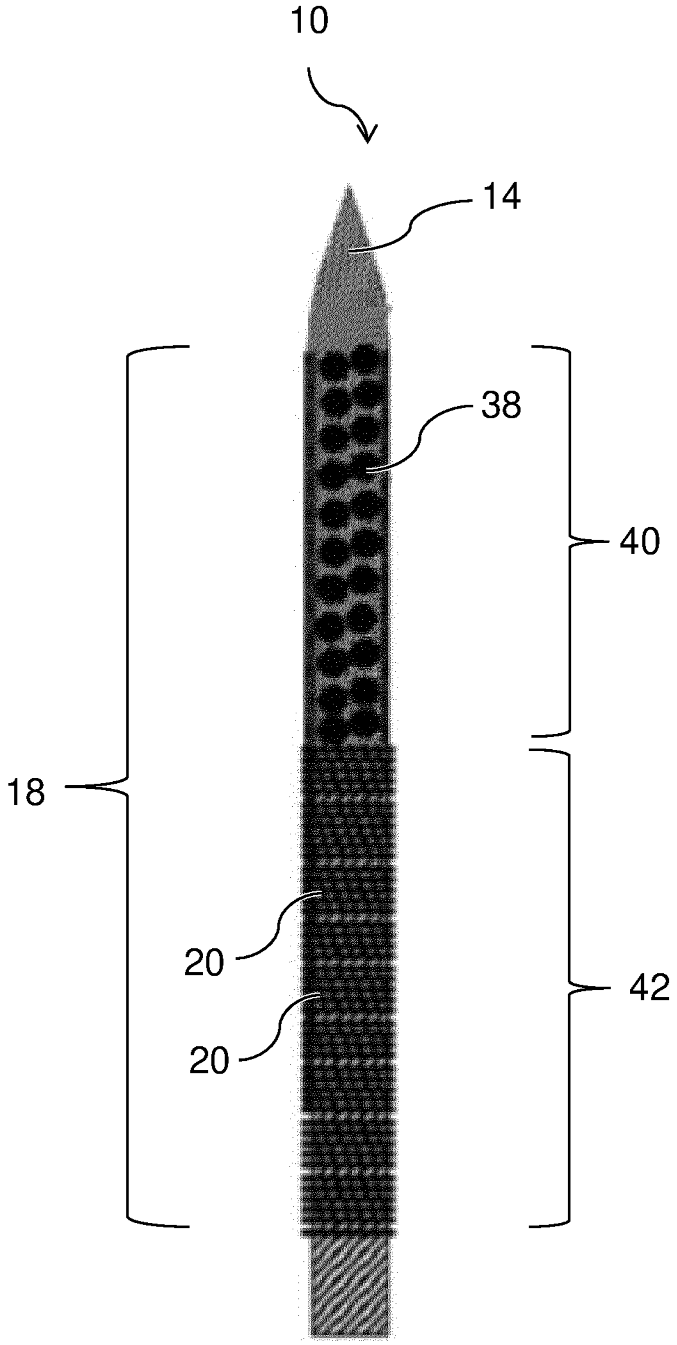
Fig. 4b

HEATER FOR AEROSOL-GENERATING DEVICE WITH HOLLOW SUSCEPTOR PIN

The present disclosure relates to a heater assembly for an aerosol-generating device. The present disclosure further relates to an aerosol-generating device. The present disclosure further relates to an aerosol-generating system comprising an aerosol-generating device and an aerosol-generating article.

It is known to provide an aerosol-generating device for generating an inhalable vapor. Such devices may heat an aerosol-forming substrate contained in an aerosol-generating article without burning the aerosol-forming substrate. The aerosol-generating article may have a rod shape for insertion of the aerosol-generating article into a heating chamber of the aerosol-generating device. A heating element is arranged in or around the heating chamber for heating the aerosol-forming substrate once the aerosol-generating article is inserted into the heating chamber of the aerosol-generating device.

It is known to use inductive heating whereby an alternating electrical current in an inductor coil induces an alternating magnetic field. This alternating magnetic field is referred to as an induction field, because it can induce alternating ring currents (eddy currents) in a susceptor if the susceptor is conductive. If the susceptor is magnetic, then hysteresis losses would occur in the susceptor. In a susceptor which is both electrically conductive and magnetic, both effects (eddy currents and hysteresis losses) will cause the susceptor to heat. Generally a material, which heats up when penetrated by an alternating magnetic field is called a susceptor. Heat generated in this manner is then propagated to the aerosol-generating substrate causing it to heat and therefore generate an aerosol. Some induction heating devices are designed to have multiple heating zones, i.e. the heating system is able to heat only a sub-portion of the full consumable. This may be, for example, to allow a single consumable to be used multiple times, or to allow a single consumable to provide a different user-experience depending on what sub-portion is used to generate an aerosol or just to achieve a more uniform user experience over a longer time period. It is known to use different inductor coils for heating different heating zones of a susceptor.

Heat produced by the heating element may inadvertently be dissipated away from the heating chamber. Heat may inadvertently be dissipated away from the heating chamber by heat conduction via components of the aerosol-generating device. Heat dissipation away from the heating chamber may cause heat losses within the heating chamber. Heat losses within the heating chamber may result in a less efficient heating. An excess amount of energy may be required to heat the heating chamber to a desired temperature.

It would be desirable to have an aerosol-generating device that may reduce heat losses from the heating chamber. It would be desirable to have an aerosol-generating device that may reduce heat losses from the susceptor. It would be desirable to have an aerosol-generating device that may reduce heating up of the outer housing of the device to be grasped by a user. It would be desirable to thermally insulate the heating chamber with respect to other components of the aerosol-generating device. It would be desirable to thermally insulate the susceptor with respect to other components outside the heating chamber. It would be desirable to have an aerosol-generating device that may provide effective thermal insulation of the heating chamber.

It would be desirable to have an aerosol-generating device that may reduce the amount of energy consumed by the heater assembly. It would be desirable to have an aerosol-generating device that may selectively heat a specific heating zone of a plurality of heating zones. It would be desirable to have an aerosol-generating device that may reduce thermal transfer between different heating zones. It would be desirable to have an aerosol-generating device that may reduce the thermal mass of the susceptor.

According to an embodiment of the invention there is provided a heater assembly for an aerosol-generating device. The heater assembly may comprise a heating chamber for heating an aerosol-forming substrate. The heater assembly may comprise a hollow pin. The hollow pin may be arranged centrally within the heating chamber. The hollow pin may be evacuated. The heater assembly may comprise a susceptor layer on an outer surface of the pin.

According to an embodiment of the invention there is provided a heater assembly for an aerosol-generating device. The heater assembly comprises a heating chamber for heating an aerosol-forming substrate. The heater assembly further comprises comprise an evacuated hollow pin. The pin is arranged centrally within the heating chamber. The heater assembly further comprises a susceptor layer on an outer surface of the pin.

By providing the heater assembly of the invention, heat losses from the heating chamber may be reduced. By providing the heater assembly of the invention, heat losses from the susceptor layer on the pin may be reduced. By providing the heater assembly of the invention, heating up of the outer housing of the device to be grasped by a user may be reduced. By providing the heater assembly of the invention, thermal insulation of the heating chamber with respect to other components of the aerosol-generating device may be improved. By providing the heater assembly of the invention, thermal insulation of the susceptor with respect to other components outside the heating chamber may be improved. By providing the heater assembly of the invention, an aerosol-generating device with a reduced thermal mass of the susceptor may be provided. By providing the heater assembly of the invention, an aerosol-generating device with a reduced amount of energy consumed by the heater assembly may be provided. By providing the heater assembly of the invention, thermal conductivity between different heating zones may be reduced. By providing the heater assembly of the invention, thermal transfer between different heating zones may be reduced. By providing the heater assembly of the invention, an aerosol-generating device that may selectively heat a specific heating zone of a plurality of heating zones maybe provided.

As used herein, the term 'evacuated hollow pin' refers to a pin comprising an evacuated air-tight hollow space in its interior.

As used herein, the term 'hollow space' relates to a volume which is substantially free of a solid material, i.e. which is not filled with solid compounds or substances. In other words, the term 'hollow space' relates to a volume which may be filled with a gaseous composition but which is otherwise empty. The air-tight hollow space is hermetically sealed from the ambient environment. In other words, the interior of the air-tight hollow space is not in fluid connection with the ambient environment. Thereby, thermal losses due to circulation of gases between the air-tight hollow space and the air outside of the pin may be avoided.

As used herein, the term 'evacuated air-tight hollow space' refers to an air-tight hollow space having a vacuum in its interior. As used herein, the term 'vacuum' refers to a gaseous composition having a reduced gas pressure being significantly below ambient pressure. For example, the gas pressure in the evacuated air-tight hollow space may be below 0.5 bar. The gas pressure in the evacuated air-tight hollow space may be below 0.1 bar. The gas pressure in the evacuated air-tight hollow space may be below 0.01 bar. The gas pressure in the evacuated air-tight hollow space may be below 1 millibar. The gas pressure in the evacuated air-tight hollow space may be below 0.1 millibar, below 0.01 millibar, or below 0.001 millibar. Due to the generally low thermal conductivity of a vacuum, an evacuated hollow pin may have a particularly low thermal conductivity. Due to the generally low thermal mass of a vacuum, an evacuated hollow pin may have a particularly low thermal mass.

As an alternative to the hollow pin being evacuated, the hollow pin may comprise an air-tight hollow space filled with a gaseous composition. The air-tight hollow space may be filled with a gaseous composition at about ambient pressure. The gas pressure within the air-tight hollow space may be between 0.9 bar and 1.1 bar, preferably about 1.0 bar. The air-tight hollow space may be filled with a gaseous composition at about ambient pressure at about 20 degrees Celsius. Temperature-dependent variations of the gas pressure within the air-tight hollow space may occur, as known to those skilled in the art. The gaseous composition may comprise an inert gas. The gaseous composition may comprise one or more of nitrogen and argon. The gaseous composition may have the composition of ambient air. The gaseous composition may comprise about 80 percent of nitrogen and about 20 percent of oxygen. The air-tight hollow space may be filled with ambient air. The gaseous composition may have the composition of ambient air at ambient pressure. Due to the suppression of circulation of gases between the air-tight hollow space and the outside air, thermal losses from the pin to other components of the device may be reduced.

The pin may comprise, or be made of, a non-ferromagnetic material. The pin may comprise, or be made of, a magnetically inert material. As used herein, the term 'magnetically inert material' refers to a material that does not substantially heat up, when penetrated by an alternating magnetic field. The pin may comprise, or be made of, a material which is not a susceptor material. This means that the pin is free of any susceptor material that is heatable by penetration with a varying magnetic field. Thus, when in use, more energy of a varying magnetic field is available to heat the susceptor layer.

The pin may comprise, or be made of, one or more of a mineral, epoxy resin, polyester, polyacrylamide, vinyl ester resin, wood, ceramic, alumina, zirconia, aramid, glass fibre, polyethylene, and glass-like material. The pin may comprise, or be made of, a non-electrically conductive and non-ferromagnetic ceramic such as alumina or zirconia.

The pin may comprise, or be made of, a material that is magnetically inert and thermally insulative. The pin may comprise, or be made of, a material that is magnetically inert, thermally insulative, and electrically insulative.

As used herein, a 'susceptor layer' or a 'discrete portion of the susceptor layer' refer to a susceptor element being a conductive element provided on an outside surface of the pin that heats up when subjected to a changing magnetic field. This may be the result of eddy currents induced in the susceptor element, hysteresis losses, or both eddy currents and hysteresis losses. During use, the susceptor elements are located in thermal contact or close thermal proximity with the aerosol-forming substrate of an aerosol-generating article received in the heating chamber of the heater assembly of the aerosol-generating device. In this manner, the aerosol-forming substrate is heated by the susceptor elements such that an aerosol is formed.

Advantageously, providing a heating zone formed from a susceptor layer on an outer surface of the pin allows the size, position, or size and position of the heating zone to be easily varied by changing one or more of the size, position, shape, and pattern of the susceptor layer. The size and configuration of the underlying pin may remain unchanged. This may provide a more flexible manufacturing process. Further, by providing a susceptor layer on an outer surface of the pin, the pin may be formed from a non-susceptor material which may be lighter or cheaper than a susceptor material. In addition to the pin comprising a hollow evacuated cavity, the pin may be formed from a thermally insulative material. This may additionally allow heat generated in the susceptor layer to remain concentrated in the heating zone. It may additionally reduce the amount of heat which is lost to other components of the aerosol-generating device. For example, it may additionally reduce the extent to which the housing of the aerosol-generating device is heated up during use.

As used herein, the terms 'thermally insulating' and 'thermally insulative' refer to a material having a bulk thermal conductivity of less than about 50 milliwatts per metre Kelvin (mW/(m K)) at 23° C. and a relative humidity of 50% as measured using the modified transient plane source (MTPS) method.

The susceptor layer may comprise a foil or film of susceptor material applied on the outer surface of the pin. For example, a foil or film of susceptor material which is glued or welded to the outer surface of pin.

The susceptor layer may be a susceptor coating deposited on the outer surface of the pin. For example, the susceptor coating may be painted or printed onto the outer surface as a liquid. The susceptor coating may be deposited on the outer surface of the pin by a vacuum deposition process, such as evaporation deposition, or sputtering. The susceptor coating may be deposited on the outer surface of the pin by electrodeposition.

The susceptor layer may be formed from any material that can be inductively heated to a temperature sufficient to aerosolise an aerosol-forming substrate. Suitable materials for the susceptor layer include graphite, molybdenum, silicon carbide, stainless steels, niobium, aluminium, nickel, nickel containing compounds, titanium, and composites of metallic materials. Preferred susceptor layers comprise a metal or carbon. Advantageously the susceptor layer comprises or consists of a ferromagnetic material, for example, ferritic iron, a ferromagnetic alloy, such as ferromagnetic steel or stainless steel, ferromagnetic particles, and ferrite. A suitable susceptor layer may be, or comprise, aluminium. The susceptor layer preferably comprises more than 5 percent, preferably more than 20 percent, more preferably more than 50 percent or more than 90 percent of ferromagnetic or paramagnetic materials. Preferred susceptor elements may be heated to a temperature in excess of 250 degrees Celsius.

The susceptor layer may comprise a metal or a metal alloy. The susceptor layer may be formed from a metal or a metal alloy.

The susceptor layer may comprise, or be made of, one or more of silicon carbide, molybdenum, graphite, stainless steel, a stainless steel alloy, Kovar®, copper, a copper tungsten alloy, a copper molybdenum alloy, and electroplated conductors, such as nickel, silver, gold, silver-platinum alloy, and a silver-palladium alloy.

The susceptor layer may comprise a monolayer. The susceptor layer may comprise a multilayer.

The susceptor layer may have a thickness of between 0.1 millimeter and 1 millimeter, preferably between 0.1 millimeter and 0.3 millimeter.

The susceptor layer may extend over any suitable amount of the outer surface of the pin. The susceptor layer may extend only partially around the circumference of the pin. The susceptor layer may extend around the entire circumference of the pin. The susceptor layer may extend along only part of the length of the pin. The susceptor layer may extend along substantially the entire length of the pin, for example at least 90 percent, or at least 95 percent of the entire length of the pin.

The susceptor layer may be a uniform layer. The susceptor layer may comprise a plurality of discrete portions. There may be a gap between individual discrete portions. By using discrete portions of the susceptor layer, the total thermal mass of the susceptor layer may be reduced. Reducing the thermal mass of the susceptor layer may advantageously reduce thermal inertia of the heater assembly. Reducing the thermal mass of the susceptor layer may advantageously reduce the energy needed to heat the susceptor layer to a desired temperature.

One or both of a length and a width of a discrete portion may be between 1 millimeters and 5 millimeters, preferably between 2 millimeters and 3 millimeters.

Two or more discrete portions may be separated along a longitudinal axis of the pin. For example two or more circumferential rings may be separated along a longitudinal axis of the pin.

A discrete portion may describe the form of a strip, ring, circle, oval, or rectangle.

Two or more discrete portions may be arranged in a regular pattern, preferably a plurality of circumferential rings arranged equidistantly along a longitudinal axis of the pin. The regular pattern may be a honey comb-like pattern.

Some or all discrete portions may be identical.

A discrete portion may differ from another discrete portions by one or more of its shape, size, thickness, and material.

The heater assembly may comprise a single heating zone defined over the susceptor layer along a longitudinal axis of the pin. The heater assembly may comprise a plurality of discrete heating zones. During use, different discrete heating zones may be heated to different temperatures. The plurality of discrete heating zones may be positioned directly adjacent to each other. The heater assembly may comprise different discrete heating zones over the susceptor layer along the longitudinal axis of the pin. This may allow the heating zones to be used to heat different parts of an aerosol-generating article in thermal proximity to the susceptor layer. For example, different parts of the same aerosol-forming substrate, or different aerosol-forming substrates, or an aerosol-forming substrate and an aerosol former of the aerosol-generating article.

The plurality of discrete heating zones may be spaced apart along the longitudinal axis of the pin. This may allow the heating zones to be used to heat different parts of an aerosol-generating article in thermal proximity to different parts of the susceptor layer without inadvertently heating adjacent parts of the aerosol-generating article. For example, heating spaced apart aerosol-forming substrates. For example, heating a first aerosol-forming substrate with a first heating zone and heating a second aerosol-forming substrate with a second heating zone without substantially heating the second aerosol-forming substrate with the first heating zone, or substantially heating the first aerosol-forming substrate with the second heating zone.

The plurality of discrete heating zones may be formed from the same susceptor material or materials. One or more of the heating zones may be formed from a susceptor layer having a different composition to the susceptor layer of at least one other heating zone, and thus different susceptor characteristics. With this arrangement, different heating profiles may be provided by the first and second heating zones by virtue of different susceptor characteristics of the first and second susceptor materials. The heat provided by each heating zone may be fine-tuned by selection of the susceptor material or materials forming part of each susceptor layer, or from which each susceptor layer is formed. This may also facilitate sequential heating of the susceptor layer. For example, by forming the heating zones from susceptor materials for which optimal heating occurs at different frequencies of alternating current. The first and second heating zones may have different temperature cycles.

One or more first discrete portions of the susceptor layer may define a first heating zone, and one or more second discrete portions may define a second heating zone. The first heating zone and the second heating zone may be arranged at different positions along the longitudinal axis of the pin. Due to the pin being evacuated and hollow, thermal conductivity may be reduced such that thermal transfer between discrete heating zones may be reduced. This may improve selective heating of specific heating zones.

One or more of the first discrete portions in the first heating zone may differ from one or more of the second discrete portions in the second heating zone by one or more of their number, shape, size, thickness, and material. This may result in different susceptor characteristics of the first and second heating zones.

The heater assembly may comprise a first inductor coil for heating the first heating zone and a second inductor coil for heating the second heating zone.

The heater assembly may comprise a single inductor coil for heating both the first and second heating zones.

On top of the susceptor layer, the pin may have a protective external layer, for example a protective ceramic layer or protective glass layer. The protective external layer may encapsulate the susceptor layer.

The pin may have any suitable cross-section. For example, the pin may have a square, oval, rectangular, triangular, pentagonal, hexagonal, or similar cross-sectional shape. The pin may have a planar or flat cross-sectional area. Preferably, the pin has a substantially circular cross-sectional area.

The pin preferably has a length of between 5 millimetres and 15 millimetres, for example between 6 millimetres and 12 mm millimetres or between 8 millimetres and 10 mm millimetres. The pin preferably has a width of between 1 millimetre and 8 millimetres, more preferably from about 3 millimetres to about 5 millimetres. The pin may have a thickness of from about 0.01 millimetres to about 2 millimetres. If the pin has a constant cross-section, for example a circular cross-section, it has a preferable width or diameter of between 1 millimetre and 5 millimetres.

The pin may project into the heating chamber. Preferably, the pin has a free end projecting into the chamber. Preferably, the free end is configured for insertion into an aerosol-generating article when the aerosol-generating article is inserted in the chamber. Preferably, the free end of the pin is tapered. This means that the cross-sectional area of a portion of the pin decreases in a direction towards the free end. Advantageously, a tapered free end facilitates insertion of the pin into an aerosol-generating article. Advantageously, a tapered free end may reduce the amount of aerosol-forming substrate displaced by the elongate pin during insertion of an aerosol-generating article into the chamber. This may reduce the amount of cleaning required. Preferably, the pin tapers towards a sharp tip at its free end.

At least a portion of the pin may extend in the longitudinal direction of the heating chamber. That is, at least a portion of the pin may extend substantially parallel with the longitudinal axis of the chamber. As used, herein, the term 'substantially parallel' means within plus or minus 10 degrees, preferably within plus or minus 5 degrees. Advantageously, this facilitates insertion of at least a portion of the pin into an aerosol-generating article when the aerosol-generating article is inserted into the heating chamber.

The magnetic axis of the one or more inductor coils may be at an angle to, that is, non-parallel with, the longitudinal axis of the heating chamber. In preferred embodiments, the magnetic axis of the one or more inductor coils is substantially parallel with the longitudinal axis of the heating chamber. This may facilitate a more compact arrangement. Preferably, at least a portion of the pin is substantially parallel with the magnetic axis of the one or more inductor coils. This may facilitate even heating of the susceptor layer on the pin by one or more inductor coils. In particularly preferred embodiments, the pin is substantially parallel with the magnetic axis of the one or more inductor coils and with the longitudinal axis of the chamber.

The invention further relates to an aerosol-generating device comprising the heater assembly as described herein.

The invention further relates to an aerosol-generating system comprising the aerosol-generating device comprising the heater assembly as described herein and an aerosol-generating article comprising an aerosol-forming substrate. The aerosol-generating article may be configured to be at least partly inserted into the heating chamber.

As used herein, the term 'aerosol-forming substrate' refers to a substrate capable of releasing volatile compounds that can form an aerosol. The volatile compounds may be released by heating or combusting the aerosol-forming substrate. As an alternative to heating or combustion, in some cases, volatile compounds may be released by a chemical reaction or by a mechanical stimulus, such as ultrasound. The aerosol-forming substrate may be solid or liquid or may comprise both solid and liquid components. An aerosol-forming substrate may be part of an aerosol-generating article.

As used herein, the term 'aerosol-generating article' refers to an article comprising an aerosol-forming substrate that is capable of releasing volatile compounds that can form an aerosol. An aerosol-generating article may be disposable.

As used herein, the term 'aerosol-generating device' refers to a device that interacts with an aerosol-forming substrate to generate an aerosol. An aerosol-generating device may interact with one or both of an aerosol-generating article comprising an aerosol-forming substrate, and a cartridge comprising an aerosol-forming substrate. In some examples, the aerosol-generating device may heat the aerosol-forming substrate to facilitate release of volatile compounds from the substrate. An electrically operated aerosol-generating device may comprise an atomiser, such as an electric heater, to heat the aerosol-forming substrate to form an aerosol.

As used herein, the term 'aerosol-generating system' refers to the combination of an aerosol-generating device with an aerosol-forming substrate. When the aerosol-forming substrate forms part of an aerosol-generating article, the aerosol-generating system refers to the combination of the aerosol-generating device with the aerosol-generating article. In the aerosol-generating system, the aerosol-forming substrate and the aerosol-generating device cooperate to generate an aerosol.

As used herein, the term 'longitudinal' is used to describe the direction along the main axis of the pin, of the heater assembly, of an aerosol-generating device, of an aerosol-generating article, or of a component of the aerosol-generating device or an aerosol-generating article, and the term 'transverse' is used to describe the direction perpendicular to the longitudinal direction. When referring to the heating chamber, the term 'longitudinal' refers to the direction in which an aerosol-generating article is inserted into the chamber and the term 'transverse' refers to a direction perpendicular to the direction in which an aerosol-generating article is inserted into the chamber.

Generally, the heating chamber may have an open end in which an aerosol-generating article is inserted, and a closed end opposite the open end. In such embodiments, the longitudinal direction is the direction extending between the open and closed ends. In certain embodiments, the longitudinal axis of the heating chamber is parallel with the longitudinal axis of the aerosol-generating device. For example, where the open end of the chamber is positioned at the proximal end of the aerosol-generating device. In other embodiments, the longitudinal axis of the heating chamber is at an angle to the longitudinal axis of the aerosol-generating device, for example transverse to the longitudinal axis of the aerosol-generating device. For example, where the open end of the heating chamber is positioned along one side of the aerosol-generating device such that an aerosol-generating article may be inserted into the heating chamber in direction which is perpendicular to the longitudinal axis of the aerosol-generating device.

As used herein, the term 'proximal' refers to a user end, or mouth end of the aerosol-generating-device, and the term 'distal' refers to the end opposite to the proximal end. When referring to the heating chamber or the inductor coil, the term 'proximal' refers to the region closest to the open end of the heating chamber and the term 'distal' refers to the region closest to the closed end. The ends of the aerosol-generating device or the heating chamber may also be referred to in relation to the direction in which air flows through the aerosol-generating device. The proximal end may be referred to as the 'downstream' end and the distal end referred to as the 'upstream' end.

As used herein, the term 'length' refers to the major dimension in a longitudinal direction of the pin, of the heating chamber, of an aerosol-generating device, of an aerosol-generating article, or of a component of the aerosol-generating device, or of the aerosol-generating article.

As used herein, the term 'width' refers to the major dimension in a transverse direction of the pin, of the heating chamber, of an aerosol-generating device, of an aerosol-generating article, or of a component of the aerosol-generating device, or of the aerosol-generating article, at a particular location along its length. The term 'thickness' refers to the dimension in a transverse direction perpendicular to the width.

Below, there is provided a non-exhaustive list of non-limiting examples. Any one or more of the features of these examples may be combined with any one or more features of another example, embodiment, or aspect described herein.

Example A: A heater assembly for an aerosol-generating device, comprising a heating chamber for heating an aerosol-forming substrate;

an evacuated hollow pin arranged centrally within the heating chamber; and a susceptor layer on an outer surface of the pin.

Example B: The heater assembly according to Example A, wherein the susceptor layer is a uniform layer.

Example C: The heater assembly according to Example A, wherein the susceptor layer comprises a plurality of discrete portions.

Example D: The heater assembly according to any of the preceding examples, wherein the susceptor layer comprises a multilayer.

Example E: The heater assembly according to any of the preceding examples, wherein the pin comprises, or is made of, a magnetically inert material.

Example F: The heater assembly according to any of Examples C to E, wherein one or both of a length and a width of a discrete portion is between 1 millimeters and 5 millimeters, preferably between 2 millimeters and 3 millimeters.

Example G: The heater assembly according to any of Examples C to F, wherein two or more discrete portions are separated along a longitudinal axis of the pin.

Example H: The heater assembly according to any of Examples C to G, wherein a discrete portion describes the form of a strip, ring, circle, oval, or rectangle.

Example I: The heater assembly according to any of Examples C to H, wherein two or more discrete portions are arranged in a regular pattern, preferably a plurality of circumferential rings arranged equidistantly along a longitudinal axis of the pin.

Example J: The heater assembly according to any of Examples C to I, wherein a discrete portion differs from another discrete portion by one or more of its shape, size, thickness, and material.

Example K: The heater assembly according to any of Examples C to J, wherein one or more first discrete portions define a first heating zone, and one or more second discrete portions define a second heating zone, and wherein the first heating zone and the second heating zone are arranged at different positions along the longitudinal axis of the pin.

Example L: The heater assembly according to Example K, comprising a first inductor coil for heating the first heating zone and a second inductor coil for heating the second heating zone.

Example M: The heater assembly according to Example K, comprising a single inductor coil for heating both the first and second heating zones.

Example N: The heater assembly according to any of Examples K to M, wherein one or more of the first discrete portions in the first heating zone differ from one or more of the second discrete portions in the second heating zone by one or more of their number, shape, size, thickness, and material.

Example O: The heater assembly according to any of the preceding examples, wherein the susceptor layer has a thickness of between 0.1 millimeter and 1 millimeter, preferably between 0.1 millimeter and 0.3 millimeter.

Example P: The heater assembly according to any of the preceding examples, wherein the susceptor layer comprises, or is made of, one or more of silicon carbide, molybdenum, graphite, stainless steel, a stainless steel alloy, Kovar®, copper, a copper tungsten alloy, a copper molybdenum alloy, and electroplated conductors, such as nickel, silver, gold, silver-platinum alloy, and a silver-palladium alloy.

Example Q: The heater assembly according to any of the preceding examples, wherein the pin comprises, or is made of, one or more of a mineral, epoxy resin, polyester, polyacrylamide, vinyl ester resin, wood, ceramic, alumina, zirconia, aramid, glass fibre, polyethylene, and glass-like material.

Example R: An aerosol-generating device comprising the heater assembly according to any of the preceding examples.

Example S: An aerosol-generating system comprising the aerosol-generating device according to Example R and an aerosol-generating article comprising an aerosol-forming substrate, wherein the aerosol-generating article is configured to be at least partly inserted into the heating chamber.

Features described in relation to one embodiment may equally be applied to other embodiments of the invention.

The invention will be further described, by way of example only, with reference to the accompanying drawings in which:

FIGS. 1*a* and 1*b* show a pin for a heater assembly of the invention;

FIGS. 4*a* and 4*b* show pins for a heater assembly of the invention.

Figures 1, 1A, 1B:
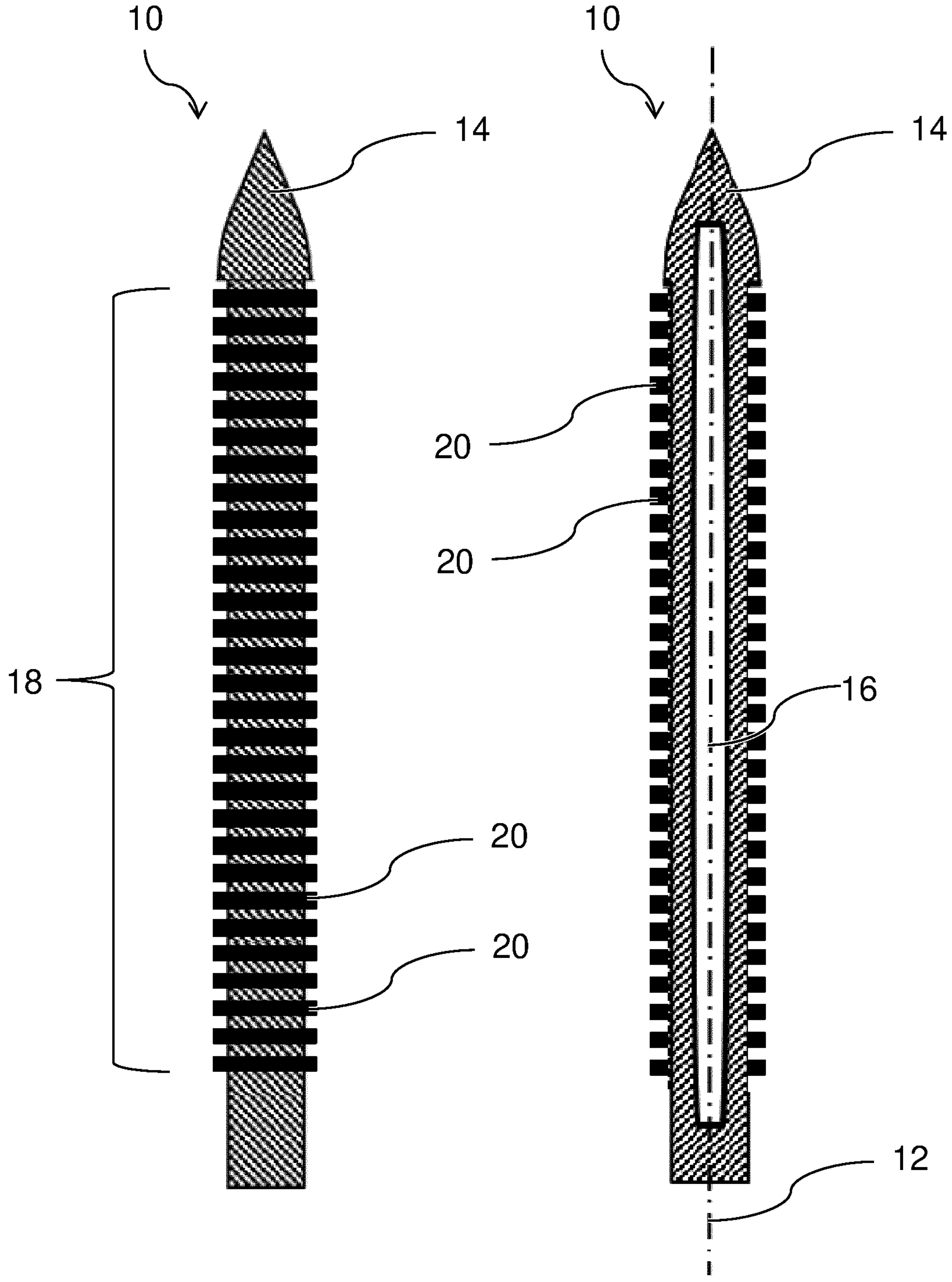

FIG. 1*a* shows a side view of a pin 10 for a heater assembly of the invention. FIG. 1*b* shows a cross-sectional view of the pin 10 of FIG. 1*a*. The central longitudinal axis of the longitudinal pin 10 is indicated by a dotted line 12. The pin 10 is made of a first material 14 being a non-ferromagnetic material. The pin comprises an inner cavity enclosing an air-tight hollow space 16 as shown in FIG. 1*b*. The hollow space 16 is evacuated. A susceptor layer 18 is arranged on an outer surface of the pin 10. The susceptor layer 18 comprises a plurality of discrete portions 20. As indicated in FIG. 1*a*, each of the individual discrete portions 20 corresponds to a circumferential ring. Gaps between neighboring circumferential rings separate the discrete portions 20 of the susceptor layer 18 along a longitudinal axis of the pin 10. The discrete portions 20 are arranged in a regular pattern by the circumferential rings being arranged equidistantly along the longitudinal axis 12 of the pin 10.

Figure 2:
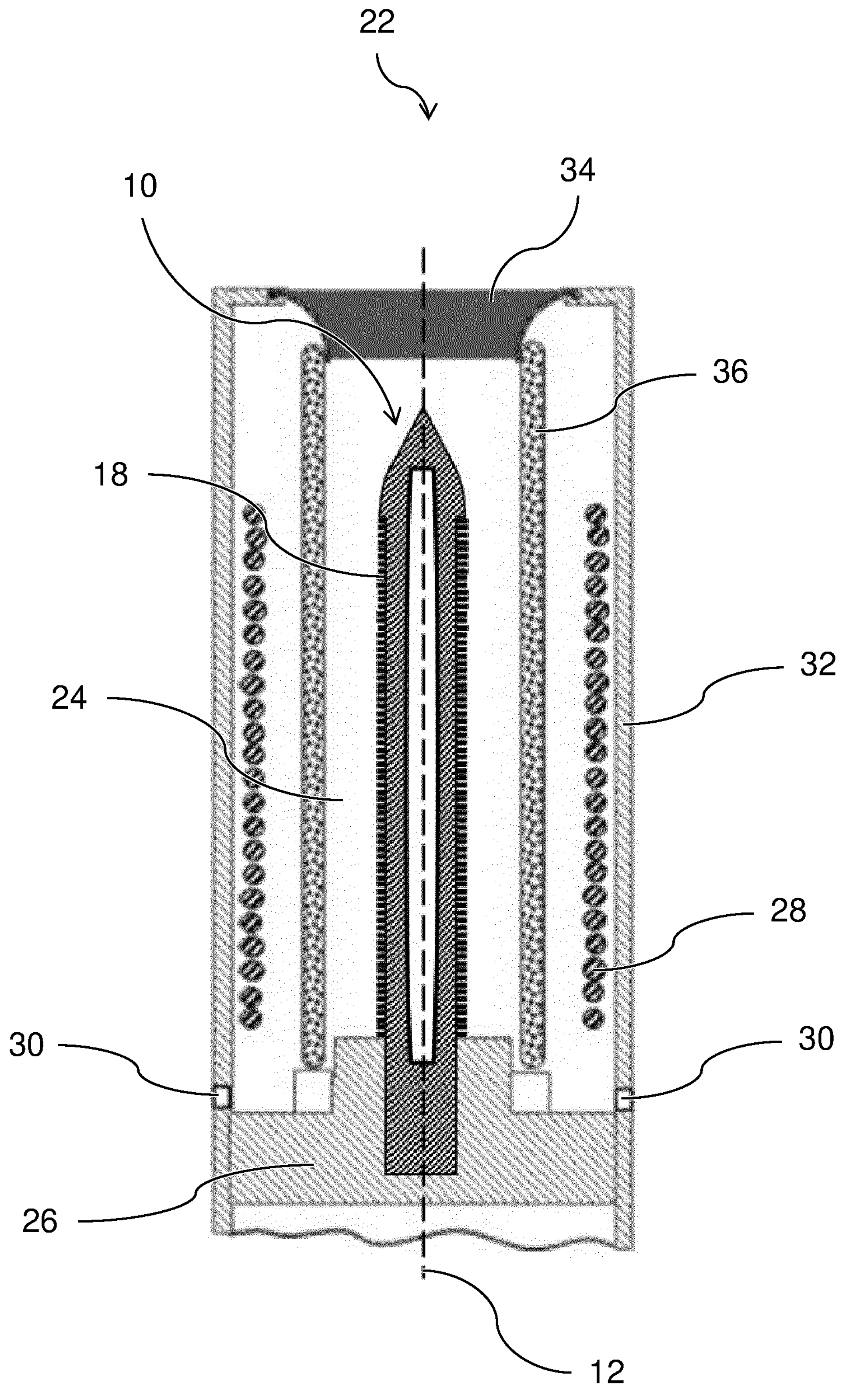
FIG. 2 shows a heater assembly of the invention.

FIG. 2 shows a heater assembly 22 of the invention as being part of an aerosol-generating device in cross-sectional view. The heater assembly 22 comprises a heating chamber 24 for heating an aerosol-forming substrate.

A hollow evacuated pin 10 is arranged centrally within the heating chamber 24. The pin is mounted on a support base 26 at a distal end of the heater assembly 22. The common central longitudinal axis of the longitudinal pin 10 and the heating chamber 24 is indicated by a dotted line 12. The pin 10 is the same pin 10 as shown in FIG. 1. The pin 10 may be any type of pin as described herein.

The susceptor layer 18 of the pin 10 is heated by means of an inductor coil 28 of the heater assembly 22. The heater assembly 22 further comprises air inlets 30 and a housing 32.

An aerosol-generating article (not shown) may be inserted into the heating chamber 24 via a central opening in a hollow sealing member 34. The aerosol-generating article may comprise a hollow cylindrical tube comprising a solid aerosol-forming substrate at its distal end thereof and a mouthpiece including a mouthpiece filter at its proximal end thereof. The distal end of the aerosol-generating article may be inserted into the heating chamber 24 such that the hollow cylindrical tube of the aerosol-generating article is arranged between the pin 10 and a thermal insulator tube 36.

Figure 3:
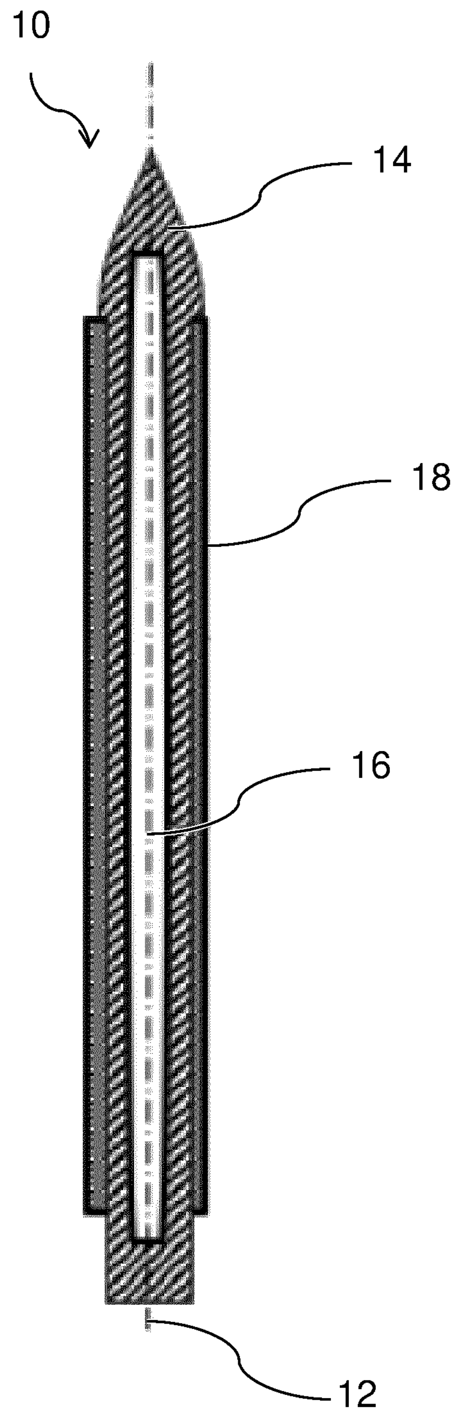
FIG. 3 shows a pin for a heater assembly of the invention.

FIG. 3 shows an embodiment of a pin 10 for a heater assembly of the invention in cross-sectional view. The pin 10 of FIG. 3 differs from the pin 10 of FIG. 1 in that the susceptor layer 18 is coated on the pin 10 of FIG. 3 in form of a uniform susceptor layer 18.

FIGS. 4*a* and 4*b* each show an embodiment of a pin 10 for a heater assembly of the invention. FIGS. 4*a* and 4*b* are not shown in cross-sectional view such that the hollow evacuated interior of the pin 10 is not shown.

In the embodiment of FIG. 4*a*, the susceptor layer 18 comprises discrete portions 40 of the susceptor layer 18 in form of circles.

In the embodiment of FIG. 4*b*, circle-shaped discrete portions 38 of the susceptor layer 18 define a first heating zone 40. Circumferential ring-shaped discrete portions 20 of the susceptor layer 18 define a second heating zone 42. The first heating zone 40 and the second heating zone 42 are arranged at different positions along the longitudinal axis of the pin 10. Due to the different arrangement of the discrete portions 20, 38 in the first and second heating zones 40, 42, the first and second heating zones 40, 42 have different susceptor characteristics. Thus, the first heating zone 40 may be heated to a different temperature than the second heating zone 42, even if the complete substrate layer 18 is heated by a single uniform inductor coil 30 as shown in the embodiment of FIG. 2. Alternatively or in addition, each of the first and second heating zones 40, 42 may be individually heated to a desired temperature by separate first and second inductor coils, respectively. The first and second inductor coils may be arranged at different positions along the longitudinal axis of the pin 10 corresponding to the respective axial positions of the first and second heating zones 40, 42.

The invention claimed is:

1. A heater assembly for an aerosol-generating device, comprising:
- a heating chamber configured to heat an aerosol-forming substrate;
- an evacuated air-tight hollow pin arranged centrally within the heating chamber; and
- a susceptor layer on an outer surface of the evacuated air-tight hollow pin.

2. The heater assembly according to claim 1, wherein the evacuated air-tight hollow pin comprises, or is made of, a magnetically inert material.

3. The heater assembly according to claim 1, wherein the susceptor layer comprises a plurality of discrete portions.

4. The heater assembly according to claim 3, wherein one or both of a length and a width of a discrete portion among the plurality of discrete portions is between 1 millimeter and 5 millimeters.

5. The heater assembly according to claim 3, wherein one or both of a length and a width of a discrete portion among the plurality of discrete portions is between 2 millimeters and 3 millimeters.

6. The heater assembly according to claim 3, wherein two or more discrete portions among the plurality of discrete portions are separated along a longitudinal axis of the evacuated air-tight hollow pin.

7. The heater assembly according to claim 3, wherein two or more discrete portions of the plurality of discrete portions are arranged in a regular pattern.

8. The heater assembly according to claim 3, wherein two or more discrete portions of the plurality of discrete portions are arranged in a plurality of circumferential rings arranged equidistantly along a longitudinal axis of the evacuated air-tight hollow pin.

9. The heater assembly according to claim 3, wherein a discrete portion among the plurality of discrete portions differs from another discrete portion among the plurality of discrete portions by one or more of its shape, size, thickness, and material.

10. The heater assembly according to claim 3,
- wherein one or more first discrete portions among the plurality of discrete portions define a first heating zone, and one or more second discrete portions among the plurality of discrete portions define a second heating zone, and
- wherein the first heating zone and the second heating zone are arranged at different positions along a longitudinal axis of the evacuated air-tight hollow pin.

11. The heater assembly according to claim 10, further comprising a first inductor coil configured to heat the first heating zone and a second inductor coil configured to heat the second heating zone.

12. The heater assembly according to claim 10, further comprising a single inductor coil configured to heat both the first and the second heating zones.

13. The heater assembly according to claim 10, wherein the one or more of the first discrete portions in the first heating zone differ from the one or more of the second discrete portions in the second heating zone by one or more of their number, shape, size, thickness, and material.

14. The heater assembly according to claim 1, wherein the susceptor layer comprises, or is made of, one or more of silicon carbide, molybdenum, graphite, stainless steel, a stainless steel alloy, an iron-nickel-cobalt alloy, copper, a copper tungsten alloy, a copper molybdenum alloy, and electroplated conductors.

15. The heater assembly according to claim 14, wherein the electroplated conductors comprise, or are made of, nickel, silver, gold, silver-platinum alloy, and a silver-palladium alloy.

16. The heater assembly according to claim 1, wherein the evacuated air-tight hollow pin comprises, or is made of, one or more of a mineral, epoxy resin, polyester, polyacrylamide, vinyl ester resin, wood, ceramic, alumina, zirconia, aramid, glass fiber, polyethylene, and glass material.

17. An aerosol-generating device comprising the heater assembly according to claim 1.

18. An aerosol-generating system, comprising the aerosol-generating device according to claim 17 and an aerosol-generating article comprising an aerosol-forming substrate, wherein the aerosol-generating article is configured to be at least partly inserted into the heating chamber.

* * * * *